Figure 1:
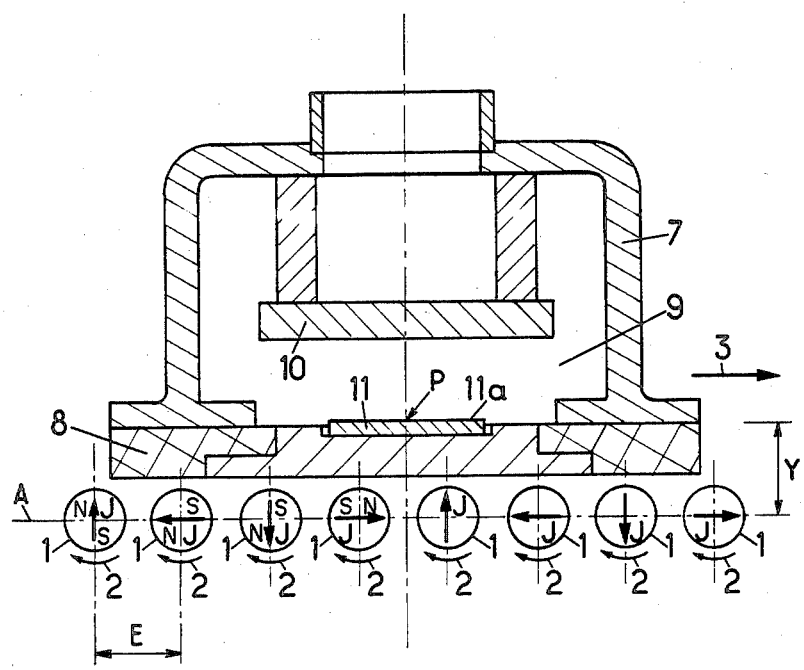

United States Patent [19]

Yonnet et al.

[11] Patent Number: 4,734,621
[45] Date of Patent: Mar. 29, 1988

[54] DEVICE FOR PRODUCING A SLIDING OR TRAVELING MAGNETIC FIELD, IN PARTICULAR FOR IONIC PROCESSING UNDER MAGNETIC FIELD

[75] Inventors: Jean P. Yonnet; Joel Penelon, both of Meylan, France

[73] Assignee: Atelier d'Electro Themie et de Constructions, Meylan, France

[21] Appl. No.: 945,984

[22] Filed: Dec. 24, 1986

[30] Foreign Application Priority Data

Dec. 27, 1985 [FR] France ................ 85 19352

[51] Int. Cl.$^4$ .................... H01J 7/24; H05B 31/26
[52] U.S. Cl. .................... 315/111.41; 313/154; 313/361.1; 313/111.21; 313/111.81
[58] Field of Search ............ 315/111.21, 111.31, 315/111.61, 111.81, 111.41; 313/154, 361.1; 250/492.21

[56] References Cited

U.S. PATENT DOCUMENTS

| | | | |
|---|---|---|---|
| 3,315,114 | 4/1967 | Thonemann et al. | 313/154 X |
| 3,864,587 | 2/1975 | Landry | 310/103 |
| 3,903,808 | 9/1975 | Folders | 104/148 |
| 4,100,441 | 7/1978 | Landry | 310/103 |
| 4,417,178 | 11/1983 | Geller et al. | 315/111.81 |
| 4,438,368 | 3/1984 | Abe et al. | 315/111.41 |
| 4,611,121 | 9/1986 | Miyamura et al. | 315/111.41 |

FOREIGN PATENT DOCUMENTS

| | | |
|---|---|---|
| 885276 | 8/1966 | Fed. Rep. of Germany. |
| 1253369 | 11/1967 | Fed. Rep. of Germany ...... 313/154 |
| WO86/06923 | 11/1987 | PCT Int'l Appl. ............ 315/111.41 |

Primary Examiner—Saxfield Chatmon
Attorney, Agent, or Firm—Armstrong, Nikaido, Marmelstein & Kobovcik

[57] ABSTRACT

Device for producing a sliding or traveling magnetic field, with a substantially constant modulus in a working region (11a), using movable permanent magnets, these permanent magnets forming cylindrical bars (1) with diametrical or radial magnetization, with one or more pairs of poles, arranged side by side with their axes parallel and equidistant (E), placed in one and the same plane (A), the magnetizations (J) of the bars (1) being successively angularly offset by a constant angle, the various bars (1) being driven rotationally around their axis at the same angular velocity and in the same direction, and the distance (Y) between the said working region (11a) and the plane (A) of the axes of the bars (1) being equal to at least 0.75 times the distance (E) between the axes of two successive bars.

11 Claims, 2 Drawing Figures

DEVICE FOR PRODUCING A SLIDING OR TRAVELING MAGNETIC FIELD, IN PARTICULAR FOR IONIC PROCESSING UNDER MAGNETIC FIELD

The invention relates to the production of a sliding or traveling magnetic field, in particular for the ionic processing used particularly for etching a silica layer produced on th surface of a silicon wafer in the manufacture of semiconductors.

In a manufacturing process of this kind, it is known that thin silicon wafers taken from a single crystal are subjected, among other operations, to a surface oxidation to produce a layer of silica, followed by etching of this silica layer through a photoresist mask. To shorten the etching times in order to increase the output rate, it is known that it is preferable to replace acid etching with an ionic etching reactor employing a cold plasma produced by an electrical discharge in a low-pressure gas mixture, between an electrode and the wafer to be etched.

The advantage of placing the reactor in an intense magnetic field in order to increase the ionization of the plasma and thus to increase the electron efficiency is furthermore known. This process is known as ionic etching under magnetic field or, in common English terminology, MIE (Magnetron Ion Etching).

The difficulty arises from the fact that the efficiency of etching, increased in this manner by magnetic confinement of the plasma, varies with the intensity of this magnetic field, and that it is extremely difficult, using simple permanent magnets, to produce a magnetic field which is sufficiently intense and sufficiently uniform over the entire extent of a silicon wafer of normal size.

In the face of this difficulty, it has been proposed to use sets of magnets mounted in opposition and moved under the wafer with an oscillating motion, or alternatively a translational motion, these magnets being mounted on an endless chain so that each point of the plasma situated above the wafer may be the seat of a magnetic field which is variable but whose average in time is constant.

However, the mechanical implementation of these oscillating or endless chain devices is relatively complicated, particularly because of the large forces to which the magnets themselves are subjected.

It is a particular purpose of the present invention to overcome the above disadvantages and to propose a device enabling a sliding magnetic field to be produced with the aid of a device which is much simpler to implement mechanically.

The device for producing a sliding or traveling magnetic field, with a modulus which is substantially constant in a working region, using movable permanent magnets, is such that these permanent magnets form cylindrical bars with diametrical or radial magnetization, with one or several pairs of poles, placed side by side with their axes parallel and equidistant in one and the same plane, the magnetizations of the bars being successfully angularly offset by a constant angle, the various bars being driven in rotation round their axis at the same angular velocity and in the same direction. Furthermore, the distance separating the said working region from the plane of the axes of the said bars is preferably equal to at least 0.75 times the distance between the axes of two successive bars.

In a preferred embodiment of the invention, the angular offset of two successive bars is between 70° and 90° (quadrature), divided by the number of pairs of poles exhibited by the bars.

In accordance with the present invention, the distance between the said working region and the plane of the axes of the said bars is preferably between once and one and a half times the distance between the axes of two successive bars.

In accordance with the present invention, the length of the said bars preferably overlaps beyond the said working region by at least once the axial separation of the bars at each end.

According to the present invention, the succession of bars preferably overlaps the said working zone by at least one additional bar at each end.

Figure 2:
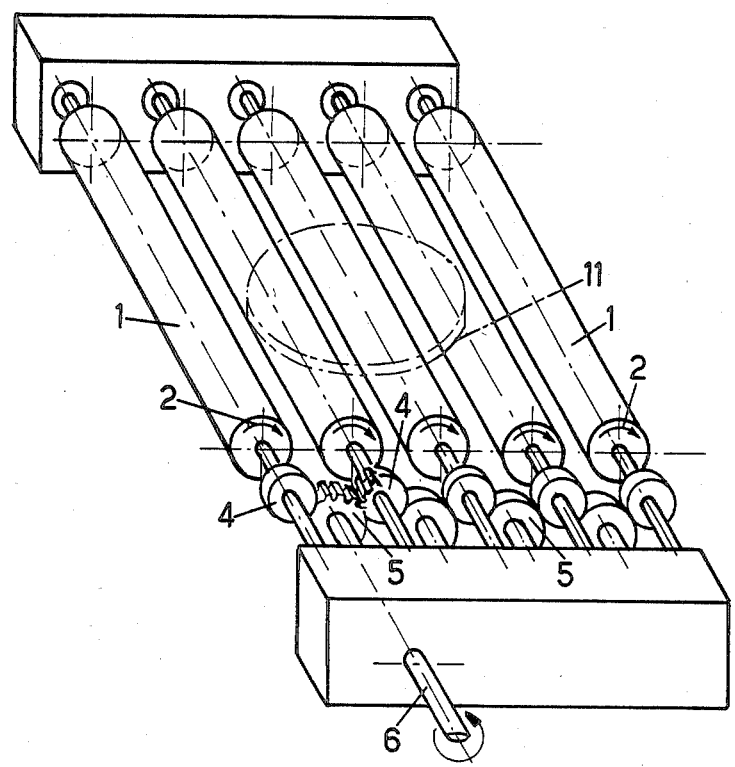

The present invention will be understood better from the study of an individual embodiment in an individual application, described by way of example without implying any limitation and illustrated in the drawing, in which:

FIG. 1 is a vertical section of a reactor for processing using plasma and magnetized bars; and FIG. 2 is a perspective view of the magnetized bars and of their drive.

First of all, if a single cylindrical bar 1 is considered, whose diametrical magnetization is defined by a vector J, and if this bar is made to rotate around its axis at a constant angular velocity in the direction of the arrow 2, this bar produces, at any point in space such as P, an induced magnetic field which may be represented by a vector situated in a plane at right angles to the axis of the bar 1, at least when the point P is sufficiently far from the ends of this bar, and it is found that this vector has a constant modulus and itself rotates around the point P with a constant velocity equal to the velocity of rotation of the bar 1, but in the reverse direction.

If now several bars which are identical to bar 1 are placed side by side with the axes parallel and uniformly spaced in a plane A, since the vectors J of each bar are successively offset by an angle which is constant between those of one and those of another, it is found that at any point P in space, the inductions produced by the various bars overlap and produce a resultant magnetic induction. This resultant induction also has a constant modulus and rotates around the point P at the same angular velocity, the reverse of that of the bars.

If now the spatial field distribution all around this same point P is considered, then it is found that the situation is just as if this field was the result of a fixed configuration moving in translation with a constant velocity in a direction represented by the arrow 3. This fixed configuration has a structure consisting of bands which are alternately north and south, permitting a polar step to be defined and, obviously, the sliding field moves forward by one such step each time the bars 1 have rotated once. Furthermore, this step is quite obviously equal to the distance between the axes of two bars 1 whose vectors J are parallel and equipollent.

By way of exemple, the successive angular offset of the magnetizations J of the bars 1 may be 180°, in which case the polar step of the sliding field is twice the interaxial distance E between the bars. However, an arrangement such as this has a torque which is very highly variable for driving the set of bars because of their mutual attractions and repulsions. For this reason, it is preferable to apply an angular offset of 120° between the magnetizations of two successive bars or better still, an angular offset of between 70° and 90°, as in the example represented in FIG. 1.

In the case of 90°, each bar is then quadratically phase-shifted relative to the preceding one, and the polar step of the sliding field is equal to four times the interaxial distance E.

When the angular offset is between 70° and 90° for bars with a diametrical magnetization, or these values divided between the number of pairs of poles, the torque for driving the series of bars 1 is reduced.

Thus, using purely mechanical means, a device of this kind makes it possible to produce a sliding or traveling magnetic field having the required intensity and velocity. The simultaneous driving of the various bars at the same velocity and in the same direction may be produced simply, as shown in FIG. 2, by an alternation of gears 4 fixed onto the shaft of successive bars, and of gears 5 engaging two successive gears 4, at least one of these gears 5 or of the shafts of the rollers 1 being itself driven by the shaft 6 of a suitable geared motor which does not need to be very powerful when the driving torque is reduced.

A device of this kind can, for example, be used as a linear accelerator for moving ionized particles. It can also be used to produce inductive heating or a medical treatment (diathermy). As a rule, field uniformity is not a necessary condition for these applications.

On the other hand, in the case of the principal application envisaged above, it has been seen that the uniformity of the induced field, especially in the direction of the horizontal plane, is a decisive factor. A satisfactory homogeneity, that is to say a substantially uniform magnetic field modulus can be obtained only when the distance Y between the plane A of the axes of the bars 1 and the plane in which the measurement is carried out is greater than 0.75 times the interaxial distance E.

A particularly uniform result is obtained when the distance Y which is used is between once and one and a half times the interaxial distance E.

FIG. 1 shows an ionic etching reactor consisting of an upper wall 7 joined in a sealed manner to a lower wall 8 to form the reactor enclosure 9, containing the low-pressure reaction gas mixture as well as an upper electrode 10 permitting a cold plasma to be produced by an electrical discharge between this electrode 10 and the wafer 11 to be etched, carried by the lower wall 8. The region in which the sliding magnetic field produced by the rotating bars 1 is used consists of the space situated just above the upper face 11a of the wafer 11 to be processed which, in the example, is parallel to the plane A of the axes of the bars 1. It can be seen that the indicated separation distance Y is not a disadvantage, since it is, in fact, needed to accommodate the thickness of the wafer 11 and the wall 8.

As an example, it is possible to use bars 1 made of Samarium-Colbat with an induction of J=1 tesla, 10 mm in diameter, magnetized diametrically and spaced at E=20 mm, to produce at a distance Y=25 mm a field of 400 gauss which is relatively uniform throughout the horizontal extent of the working region 11a, provided that the length of the bars overlaps the extent of this working region 11a by at least once the interaxial distance E between the bars at each end, and that there is also in the perpendicular direction at least one additional bar at each end beyond the equilibrium of this working region, as can be seen in FIG. 1. A field of 600 gauss may be produced under the same conditions with a bar diameter of 12.5 mm, an interaxial distance E of 20 mm and a distance Y of 25 mm.

The invention thus makes it possible to produce a relatively intense field which is relatively uniform over a wide extent, without the need for heavy magnets or for a complicated mechanical arrangement. In particular, the indicated field values already permit a magnetic confinement of the plasma which is capable of increasing the ion density approximately tenfold, which is a remarkable result. Obviously, the uniformity of the sliding or traveling magnetic field extends in both directions in the horizontal plane, whereas in the vertical plane a rapid decrease is observed as Y increases. However, this effect involves no disadvantage in the envisaged application.

We claim:

1. A device for producing a traveling magnetic field, with a substantially constant modulus in a working region (11a), using movable permanent magnets, characterized in that the permanent magnets are provided in the form of cylindrical bars (1) with at least one pair of diametrically opposed magnetic poles extending along the axial length of each said bar, said bars being arranged side by side with their axes parallel and equally spaced (E) and in the same plane (A), the magnetic poles (J) of the bars (1) being successively angularly offset by a constant angle, said cylindrical bars (1) being rotationally driven around their axis at the same angular velocity and in the same direction, the said working region (11a) being parallel to the plane (A) of the axis of said bars, and the distance (Y) separating the said working region (11a) from the plane (A) of the axes of the bars (1) being at least 0.75 times the distance (E) between the axes of two adjacent bars.

2. A device according to claim 1, characterized in that said angular offset is between 70° and 90° (quadrature), divided by the number of pairs of poles.

3. A device according to claims 1 or 2, characterized in that the distance (Y) between the said working region (11a) and the plane (A) of the axes of the bars (1) is between one and one and a half times the distance (E) between the axes of two adjacent bars (1).

4. A device according to claim 1, characterized in that the length of said bars (1) overlaps beyond said working region (11a) by at least the interaxial distance (E) between the bars at each end.

5. A device according to claim 1, characterized in that the succession of bars (1) overlaps the said working region (11a) by at least one additional bar at each end.

6. A device according to claim 1, characterized in that said device is associated with a plasma reactor (9) and that said device is arranged so that the surface of the articles to be processed is situated in the said working region (11a).

7. A device for producing a traveling magnetic field in a plasma processing reactor (9) with a substantially constant modulus in a working region (11a) situated at a surface of the articles to be processed, by using movable permanent magnets, characterized in that the permanent magnets are provided in the form of a plurality of cylindrical bars (1) with at least one pair of diametrically opposed magnetic poles extending along the axial length of the surface of each said bar, said bars being arranged side by side with their axes parallel, equally spaced (E) and in the same plane (A), which is parallel to said working region (11a), the magnetic poles (J) of the bars (1) being successively angularly offset by a constant angle, said cylindrical bars (1) being rotationally driven around their axis at the same angular velocity and in the same direction, and the distance (Y) separating the said working region (11a) from the plane (A) of the axes of the bars (1) being at least 0.75 times the distance (E) between the axes of two adjacent bars.

8. A device according to claim 7, characterize that said angular offset is between 70° and 90° (quadrature), divided by the number of pairs of poles.

9. A device according to claims 1 or 2, characterized in that the distance (Y) between the said working region (11a) nd the plane (A) of the axes of the bars (1) is between one nd one and a half times the distance (E) between the axes of wo successive bars (1).

10. A device according to claim 7, characterized in that the length of said bars (1) overlaps beyond said working regin (11a) by at least the interaxial distance (E) between the bars at each end.

11. A device according to claim 7, characterized in hat the succession of bars (1) overlaps the said working egion (11a) by at least one additional bar at each end.

* * * * *